United States Patent Office 3,641,054
Patented Feb. 8, 1972

3,641,054
METHOD OF PREPARING 1,4-OXATHIANES AND DERIVATIVES THEREOF
Donald J. Martin, Irvington, N.Y., assignor to Stauffer Chemical Company, New York, N.Y.
No Drawing. Filed Feb. 4, 1969, Ser. No. 796,569
Int. Cl. C07d 89/14
U.S. Cl. 260—327 P    10 Claims

ABSTRACT OF THE DISCLOSURE 1,4-oxathianes are prepared by reacting a bis(2-haloalkyl) ether with an alkali metal hydrosulfide in an aqueous solution saturated with hydrogen sulfide. The 4-oxide derivatives of 1,4-oxathiane can be prepared by reacting the 1,4-oxathiane with a nitrogen oxide compound at a temperature of from about −20° C. to about 100° C. The 4-oxide can be further reacted with an organic acid anhydride to form dihydro p-oxathiins.

The present invention relates to an improved process for preparing 1,4-oxathiane and its derivatives, which can be represented by the general formula:

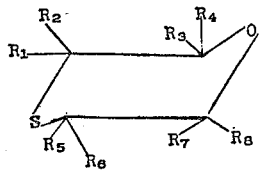

I.

wherein $R_1$ to $R_8$ represent substituents independently selected from the group consisting of hydrogen, lower alkyl of from 1 to 4 carbon atoms, alkoxy, phenyl and phenoxy. Preferably, $R_1$ through $R_8$ are hydrogen.

1,4-oxathianes are known compounds and have been prepared by numerous methods. One such method for the preparation of 1,4-oxathiane is the reaction of bis(2-chloroethyl) ether with an alkali metal hydrogen sulfide (MHS) (U.S. Pat. 2,508,005) or with sodium sulfide (U.S. Pat. 2,894,956). This type of reaction, i.e., the bis(2-haloalkyl) ether-sulfide reaction, requires the use of elevated temperatures, high boiling organic solvent and extended reaction times of about 30 hours to obtain useful yields.

It has been found that high yields can now be obtained in a fraction of the reaction time presently required using the bis(2-haloalkyl) ether-sulfide reaction, and without the use of a high boiling organic solvent.

In accordance with the present invention, there is provided an improved method for preparing 1,4-oxathiane compounds of the formula:

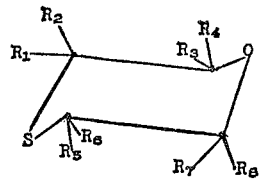

I.

wherein $R_1$ to $R_8$ are substituents as defined hereinbefore, which comprises reacting bis(2-haloalkyl) ether of the formula:

II.
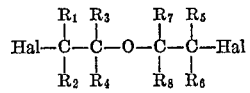

with an alkali metal hydrosulfide in an aqueous solution saturated with hydrogen sulfide, said reaction being conducted at a temperature within the range of from about 30° C. to about 200° C. Sufficient pressure is maintained within the reaction vessel to maintain the hydrogen sulfide in solution. The reaction proceeds fairly rapidly to provide high yields, above 80% in less than 4 to 5 hour reaction time.

The present invention also relates to an improved process for preparing 1,4-oxathiane-4-oxide and its derivatives which all can be represented by the general formula:

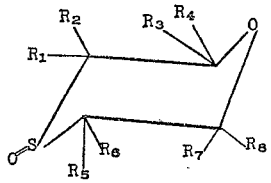

III.

wherein $R_1$ to $R_2$ are as defined above; which comprises further treating 1,4-oxathianes as defined in Formula I with nitrogen dioxide, dinitrogen tetroxide, equilibrium mixtures thereof and hydrates thereof, i.e., nitric acid. The reaction of the 1,4-oxathiane with the nitrogen dioxide and/or dinitrogen tetroxide is particularly facilitated by conducting the reaction in a non-aqueous low boiling solvent. The reaction of the 1,4-oxathiane with the nitric acid can be accomplished by the direct application of concentrated nitric acid to the 1,4-oxathiane. The reaction procedure of the present invention prevents the formation of undesirable sulfone derivatives heretofore a problem in preparing the 1,4-oxathiane-4-oxide compounds and the products are readily separated from the reaction mixture.

Certain 1,4-oxathiane-4-oxides, i.e., those having at least two adjacent

groups can be further reacted with an organic acid anhydride with the formula:

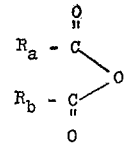

IV.

wherein $R_a$ and $R_b$ can be lower alkyl, phenyl, lower alkyl substituted phenyl, phenyl substituted lower alkyl or $R_a$ and $R_b$ can be combined to form a heterocyclic ring to prepare esters of 1,4-oxathiane of the formula:

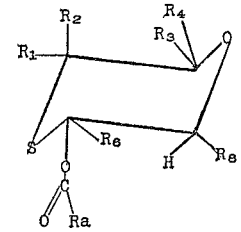

V.

Upon pyrolysis, the esters of 1,4-oxathiane yield dihydro p-oxathiin compounds of the formula:

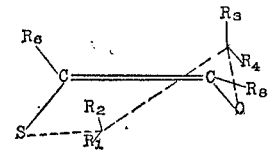

VI.

wherein the R substituents are as defined hereinbefore. The ester forming reaction basically comprises reacting a 1,4-oxathiane-4-oxides with the desired organic acid anhydride under simple refluxing conditions to provide the desired ester of the 1,4-oxathiane. The acid ester group is generally in the 3 position, i.e., alpha to sulphur, although some of the ester might also exist in the 2 position or alpha to oxygen. The reaction between the 1,4-oxathiane-4-oxide and the organic acid anhydride can be conducted in inert organic solvents of the aromatic type such as benzene, toluene, and xylene, etc., if desired. The ester can be isolated and utilized as is or can be further treated to prepare dihydro p-oxathiin compounds. The preparation of the dihydro p-oxathiin basically comprises pyrolyzing the ester group from the ester of 1,4-oxathiane and can be conventionally accomplished by distilling the ester, though other methods such as treating the ester on a heated column can also be utilized.

The bis(2-haloalkyl) ethers used in the process of the present invention can be represented by the formula:

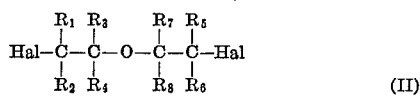
(II)

wherein Hal means halogen as exemplified by fluorine, chlorine, bromine and iodine, and $R_1$-$R_8$ can be the same or different groups selected from the group consisting of hydrogen, lower alkyl of from 1 to 4 carbon atoms, alkoxy, phenyl and phenoxy. As used herein, the term "bis" in bis(2-haloalkyl) ethers is intended to refer generically to the symmetrical ether of the formula:

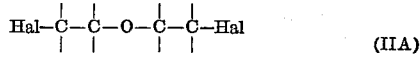
(IIA)

and thus the use of the term "bis" is not intended to preclude the use of compounds which are unsymmetrical with regard to substituents to the

group on either side of the ethereal oxygen. The $R_1$ to $R_8$ substituents can be hydrogen; lower alkyl of from 1 to 4 carbon atoms such as methyl, ethyl, n-propyl, isopropyl, n-butyl, isobutyl, sec-butyl and tert-butyl; alkoxy such as methoxy, ethoxy, isopropoxy, butoxy; aryl such as phenyl, benzyl, methylphenyl, dimethylphenyl, biphenyl, naphthyl and the like; aryloxy such as phenoxy, methylphenoxy, dimethylphenoxy and the like. Also included are substituted derivatives thereof with substituents such as amino, hydroxy, and any other substituent which is inert to the general reaction and does not affect the same. These ethers are a known class of compounds and can be prepared by known methods.

Illustrative of the bis(2-haloalkyl) ethers which can be used in the process of the present invention are bis(2-chloroethyl) ether; bis(2-bromoethyl) ether; bis(2-fluoroethyl) ether; 2-bromoethyl, 2-chloropropyl ether; 2-chloroethyl, 2-chlorobutyl ether; 2-chloroethyl, 2-chloropropyl ether; 2-chloroethyl, 1,1-dimethyl 2-chloroethyl ether; 2-bromobutyl, 2-chloropropyl ether; 2-iodoethyl, 2-chloro 2-phenylethyl ether; 2-chloroethyl, 2-chloro-2-methoxy ethyl ether; 2-chloroethyl, 2-chloro-2-phenoxy ethyl ether. Preferably the halogen is chlorine, and the $R_1$ and $R_8$ substituents (see Formula II) are hydrogen, i.e., bis(2-chloroethyl) ether.

The bis(2-haloalkyl) ether is reacted with an alkali metal hydrosulfide. These compounds are represented by the formula —MHS— wherein M is an alkali metal ion such as lithium, sodium, potassium, and the like. Included within the term alkali metal hydrosulfide is the compound ammonium hydrosulfide, i.e., wherein M is ammonium. Also included within the term alkali metal hydrosulfides are the compounds which form such hydrosulfides when dissolved in water such as the $M_2S$ sulfides, e.g., sodium sulfide and potassium sulfide.

The reaction between the bis(2-haloalkyl) ether and the alkali metal hydrosulfide is conducted in an aqueous solution saturated with hydrogen sulfide. The hydrogen sulfide can be added as a gas to the aqueous reaction medium or prepared in situ by the use of compounds which generate hydrogen sulfide when contacted with water or heat or both. The hydrogen sulfide is preferably added to the aqueous reaction medium at room temperature because of the greater solubility of hydrogen sulfide in water at the lower temperature. The amount of water used is that quantity necessary to form a solution of all reactants which is not too viscous to work with nor too dilute to be effective. It has been found that from about 5 to about 10 mole of water per mole of the alkali metal hydrosulfide are sufficient to provide effective results.

The reaction of the halogenated ether and the alkali metal hydrosulfide in the hydrogen sulfide saturated aqueous solution proceeds readily. Stoichiometric proportions can be used; however, a slight excess of the alkali metal hydrosulfide is preferred as higher yields can be obtained. The reactants are placed in a reaction vessel preferably a pressurizable container having heating means, such as an autoclave. The reactants are heated to a temperature of preferably from about 30° C. to about 110° C. and more preferably at a temperature within the range of from about 80° C. to about 110° C., though temperatures as high as 200° C. can also be used. The heating is continued for a sufficient length of time to effect substantially complete reaction between the reactants, e.g., from 2 to 10 hours and usually 4 to 5 hours. A slight pressure is maintained within the reaction vessel to maintain the hydrogen sulfide in solution. An inert gas such as nitrogen can be utilized to accomplish this end.

Some oxathianes form azeotropes with water and can be readily separated from the reaction mixture by distillation. The azeotrope of 1,4-oxathiane and water distills off at about 95° C. at atmospheric pressure. The distillate upon condensation forms a heterogeneous mixture, e.g., a water phase and an oil phase. The oil phase contains essentially all of the oxathiane. The oil phase can be dried with calcium or sodium sulfate and redistilled to separate the product from the other constituents. Additional product may be recovered from the water phase by redistillation or by extraction with diethyl ether. Diethyl ether can also be used to extract the basic product from the reaction mixture and this is a preferred method of product recovery.

The invention is further illustrated in the examples which follow.

EXAMPLE I 1,4-oxathiane is prepared by first dissolving 121 grams (1.1 mole) of sodium hydrosulfide in 150 milliliters of distilled water. The aqueous solution is saturated at ambient temperatures with hydrogen sulfide. The hydrogen sulfide saturated sodium hydrosulfide solution is charged into a 300 cubic centimeter autoclave along with 71.5 grams (0.5 mole) of bis(2-chloroethyl) ether. The pressure within the autoclave is raised to 400 pounds per square inch with nitrogen. The autoclave is then heated to 100° C. while rocking and maintained at this temperature for 2¼ hours. The autoclave is then cooled to room temperature and vented. The crude reaction mixture is filtered, and extracted 3 times with diethyl ether. The combined ether extracts are dried, and the ether removed providing 56 grams of a yellow liquid which analyzed for 83.1% 1,4-oxathiane or a 90% yield.

Similar experiments run at 0° C. for 2 hours showed no reaction and at 2–20° C. for 3 hours about 1% reaction. Results indicate that low temperature reaction in water or methanol as solvent is unsuccessful.

1,4-oxathiane such as prepared in Example I, and its derivatives can be further reacted with a higher valence nitrogen oxide and its hydrates to form 1,4-oxathiane-4- oxide. The higher valence nitrogen oxides are nitrogen dioxide, and dinitrogen tetroxide. The hydrate of nitrogen dioxide is nitric acid. Nitrogen dioxide and dinitrogen tetroxide can be used together since they form an equilibrium admixture (at 60° C. and one atmosphere, two parts nitrogen dioxide to one part dinitrogen tetroxide). The equilibrium favors the production of the dinitrogen tetroxide, and as the dinitrogen tetroxide is consumed in the reaction, the equilibrium shifts to the formation of the tetroxide. However, it is preferred to use pure dinitrogen tetroxide at ambient temperatures where the formation of the equilibrium is less favorable. A large excess of the nitrogen oxide is generally used to insure completion of reaction. The temperature of the reaction is preferably ambient though temperatures as low as −20° C. and as high as about 100° C. can be used. The nitric acid is preferably used as a solution containing from about 50% to about 100% $HNO_3$. It is intended that this range covers concentrated nitric acid, i.e., from about 50% to about 75% $HNO_3$, as well as red and white fuming nitric acid, i.e., from about 75% to about 100% $HNO_3$. While direct application of the nitrogen oxides and particularly the concentrated nitric acid produces product in good yield, it is preferred to conduct the reaction of the 1,4-oxathiane with the nitrogen dioxide and/or the dinitrogen tetroxide in the presence of a low boiling inert organic solvent in a volume amount of from about 2% to about 50% by volume and preferably from about 5% to about 20% by volume. The use of the inert solvent permits simple isolation of the product upon completion of the reaction sequence by evaporation thereof after flushing with nitrogen to remove any unreacted nitrogen oxides. Suitable inert solvents can be illustrated by chloroform, carbon tetrachloride, methylene chloride, and the like. The preferred reaction is accomplished at room temperature using chloroform and gaseous dinitrogen tetraoxide as is exemplified in the example which follows:

EXAMPLE 2

10 grams of 1,4-oxathiane, such as that prepared in Example 1, are dissolved in 100 milliliters of dry chloroform. The reaction mixture is then treated with a slow stream of dinitrogen tetraoxide at room temperature (20–25° C.) for about 4 hours. The solution is purged with nitrogen, dried with magnesium sulfate, filtered and evaporated to give 11 grams of clear slightly yellow liquid. This product exhibits infrared and nuclear magnetic resonance spectra which correspond with authentic spectra. Gas liquid phase chromatography shows that the product is greater than 98% pure 1,4-oxathiane-4-oxide.

1,4-oxathiane-4-oxides wherein $R_5$ and $R_7$ are hydrogen can be further reacted with an organic acid anhydride to form esters of 1,4-oxathiane as defined in Formula V. These esters can be pyrolyzed to form dihydro p-oxathiin compounds of the formula:

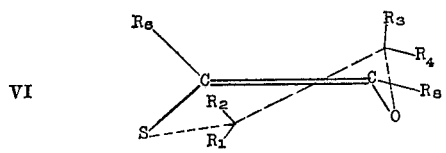

wherein the R substituents are the same as defined hereinbefore. The reaction can be conducted in the absence of solvent but is preferrably conducted in the presence of an inert non-reactive organic solvent particularly if the organic acid anhydride is a solid. Suitable solvents can be illustrated by cyclohexane; linear hydrocarbons, e.g., hexane, octane; dioxane; and aromatics such as benzene, xylene, toluene and the like. The 1,4-oxathiane-4-oxide compound must have at least two adjacent

groups in order for the reaction to be accomplished, i.e., at least $R_5$ and $R_7$ of Formula III must be hydrogen. The organic acid anhydrides which can be used are any of those acid anhydrides which correspond to the formula:

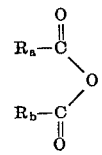

wherein $R_a$ and $R_b$ can be lower alkyl of from 1 to 4 carbons, phenyl, alkyl substituted phenyl, and phenyl substituted alkyl. These can be illustrated by benzoic anhydride, acetic anhydride, and the like. Also included within the scope of the present invention are cyclic anhydrides such as maleic anhydride, succinnic anhydride, phthalic anhydride and the like. The reaction can be conducted in an aromatic solvent of the benzene type, e.g., benzene, toluene, xylene, and the like, if desired. The reaction is a simple reaction which proceeds readily at the reflux temperature of the reaction mixture so as to afford the ester of 1,4-oxathiane. This product can be separated and utilized per se or pyrolyzed to afford the desired dihydro p-oxathiin compound. A simple method for effecting the pyrolysis is by distilling the ester of the 1,4-oxathiane. This will be further illustrated in the example which follows:

EXAMPLE 3

9.45 grams (0.0785 mole) of 1,4-oxathiane-4-oxide is placed in a flask along with 17.8 grams (0.0785 mole) of benzoic anhydride and 50 milliliters of dry benzene. The clear colorless solution is heated to reflux and allowed to reflux for 21 hours to insure completeness of reaction. After cooling to room temperature, the reaction mixture is distilled at atmospheric pressure and then under vacuum to product dihydro p-oxathiin, boiling point 37° C. to 40° C. at 10 millimeters of mercury pressures. Structure assignment was confirmed by gas phase chromatography infrared spectroscopy and nuclear magnetic resonance analytical techniques.

EXAMPLE 4

A benzene solution of 12.0 grams of 1,4-oxathiane-4-oxide and 10.2 grams of acetic anhydride was placed in a flask and gently refluxed for 17 hours. The reaction mixture is then distilled affording the following fractions which when analyzed by gas phase chromatography and nuclear magnetic resonance analytical techniques, provided the following results:

|  |  |  | Dihydro oxathiin | |
|---|---|---|---|---|
|  | Amount, grams | Boiling point, °C. | Percent | Amount grams |
| Fraction: |  |  |  |  |
| 1 | 6.7 | 108–28 | 21 | 1.407 |
| 2 | 7.7 | 128–29 | 39 | 3.003 |
| 3 | 1.1 | 120–36 | 55 | 0.605 |
| 4 | 1.3 | 138 | 67 | 0.871 |
| Total |  |  |  | 5.886 |

The total amount of dihydro p-oxathiin formed was 5.89 grams or 58% yield. The other component in Fraction 1–4 is acetic acid which can be easily removed by standard techniques.

What is claimed is:

1. Method for preparing 1,4-oxathiane compounds of the formula:

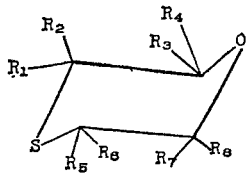

wherein $R_1$ to $R_8$ represent substituents independently selected from the group consisting of hydrogen, lower alkyl of from 1 to 4 carbon atoms, comprising reacting bis(2-haloalkyl) ether of the formula:

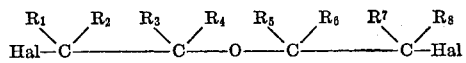

wherein $R_1$ to $R_8$ are defined above and Hal is halogen with an alkali metal hydrosulfide in an aqueous solution saturated with hydrogen sulfide at a temperature of from about 30° C. to about 200° C.

2. A method as recited in claim 1 wherein all said $R_1$ to $R_8$ substituents are hydrogen.

3. A method as recited in claim 1 wherein said Hal group is chlorine.

4. Method as recited in claim 1 wherein said bis(2-haloalkyl) ether is bis(2-chloroethyl) ether.

5. A method as recited in claim 1 wherein said alkali metal hydrosulfide is sodium hydrosulfide.

6. A method as recited in claim 1 wherein said temperature is within the range of from about 80° C. to about 110° C.

7. A method as recited in claim 1 wherein said aqueous solution is saturated with hydrogen sulfide at room temperature prior to heating to the said temperature of reaction.

8. Esters of 1,4 oxathiane of the formula

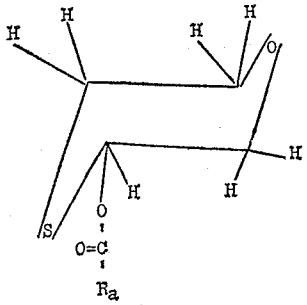

wherein $R_a$ represents a substituent selected from the group consisting of lower alkyl of from 1 to 4 carbon atoms, phenyl, lower alkyl substituted phenyl, and phenyl substituted lower alkyl.

9. The esters as recited in claim 8 wherein $R_a$ is methyl.

10. The esters as recited in claim 8 wherein $R_a$ is phenyl.

References Cited

Parham, et al.: J.O.C. 28; 2686–90 (10–63).

Karasch, Org. S. Cpds. I (Pergamon, Oxford, 1961), pp. 158, 170–2.

Parham, et al., J.A.C.S., 83: 4034–8 (10–61).

Fieser, et al., Advanced Organic Chemistry (Reinhold, N.Y., 1961), pp. 308–9, 312–3.

HENRY R. JILES, Primary Examiner

C. M. SHURKO, Assistant Examiner